United States Patent
Stenstrom et al.

(10) Patent No.: US 6,471,268 B1
(45) Date of Patent: Oct. 29, 2002

(54) DEVICE FOR DISPLACING A PIPE ETC

(76) Inventors: Peter John Stenstrom, Dumballs Road, Cardiff, CF1 6JE (GB); Gareth King, Dumballs Road, Cardiff, CF1 6JE (GB)

(*) Notice: Subject to any disclaimer, the term of this patent is extended or adjusted under 35 U.S.C. 154(b) by 0 days.

(21) Appl. No.: 09/551,055

(22) Filed: Apr. 18, 2000

(30) Foreign Application Priority Data

Apr. 20, 1999 (GB) .............................................. 9908866
Jul. 22, 1999 (GB) .............................................. 9917186
Aug. 2, 1999 (GB) .............................................. 9917906

(51) Int. Cl.⁷ .............................. B63B 21/20; B66C 1/42
(52) U.S. Cl. .......................... 294/15; 294/1.1; 16/421; 16/430; 16/431; 16/DIG. 12; 24/132 R
(58) Field of Search ......................... 294/1.1, 15, 171, 294/102.1, 102.2, 132, 137; 16/421, 430, 431, DIG. 12; 24/115 A, 115 R, 129 D

(56) References Cited

U.S. PATENT DOCUMENTS

| | | | |
|---|---|---|---|
| 292,148 A | * 1/1884 | Travis et al. | 24/129 D |
| 1,235,309 A | * 7/1917 | Garretson | 16/431 |
| 1,413,690 A | * 4/1922 | Slocum | 24/132 R |
| 1,654,340 A | * 12/1927 | McIntosh | 24/115 A |
| 1,800,254 A | * 4/1931 | Holmes | 16/421 |
| 2,398,436 A | * 4/1946 | Mason | 294/171 |
| 3,682,023 A | * 8/1972 | Grenre, Jr. | 294/171 |
| 3,776,586 A | * 12/1973 | Ahlgren et al. | 294/102.1 |
| 3,854,768 A | * 12/1974 | King, Sr. | 294/102.1 |
| 3,981,043 A | * 9/1976 | Curry | 16/430 |
| 4,143,446 A | 3/1979 | Down | |
| 4,333,649 A | 6/1982 | Vaughn et al. | |
| 4,651,351 A | 3/1987 | Endo et al. | |
| 4,823,919 A | * 4/1989 | Hayatdavoudi | 294/102.2 |
| 4,890,355 A | * 1/1990 | Schulten | 294/171 |
| 5,068,949 A | * 12/1991 | Horace | 24/115 R |
| 5,083,825 A | * 1/1992 | Bystrom et al. | 294/171 |
| 5,364,148 A | * 11/1994 | Bartocci | 294/171 |
| 5,544,926 A | 8/1996 | Ravencroft | 294/1.1 |
| 5,775,756 A | * 7/1998 | Rozenich | 294/137 |
| 5,848,453 A | * 12/1998 | Racodon | 16/DIG. 12 |
| 5,860,190 A | * 1/1999 | Cano | 16/DIG. 12 |

FOREIGN PATENT DOCUMENTS

| | | | | |
|---|---|---|---|---|
| DE | 3641340 | * | 6/1988 | ............... 294/171 |
| EP | 0003636 | * | 8/1979 | ............... 24/115 R |
| EP | 0485034 A1 | | 5/1992 | |
| EP | 0485034 | | 5/1992 | |
| FR | 2393654 | | 1/1978 | |
| WO | 7900511 | | 8/1979 | |

* cited by examiner

Primary Examiner—Eileen D. Lillis
Assistant Examiner—Paul T. Chin
(74) Attorney, Agent, or Firm—Edwin D. Schindler

(57) ABSTRACT

A device for engaging an elongate article, such as a pipe or cable, for displacing the article longitudinally, comprises a tubular body formed of a plurality of longitudinal parts arranged to be opened apart and then closed together around the elongate article, and at least one collar formed of a plurality of parts carried by respective parts of the tubular body. The collar has a radially inner surface to form an interference engagement with the outer surface of the article, and a radially outer surface to engage the inner surface of the tubular body. The outer surface of the collar and/or the inner surface of the tubular body is tapered towards the trailing end of the device.

18 Claims, 2 Drawing Sheets

DEVICE FOR DISPLACING A PIPE ETC

FIELD OF THE INVENTION

The present invention relates to a device for engaging a pipe, cable or other elongate article, to facilitate longitudinal displacement of the article.

BACKGROUND OF THE INVENTION

For example when installing plastic pipes (whether to carry water or gas), it is commonly necessary to displace the pipe longitudinally of itself, for example when drawing it off a reel or passing it through an underground duct. Hitherto, the pipe has been gripped by hand and then pulled or pushed manually in order to displace the pipe longitudinally of itself. However, it is often difficult to maintain an adequate manual grip on the pipe, especially where the outer surface of the pipe is wet or greasy. Similar problems arise when installing plastic-sheathed cables.

SUMMARY OF THE INVENTION

We have now devised a device which facilitates the longitudinal displacement of a pipe, cable or other elongate article and which overcomes the problems outlined above.

In accordance with the present invention, as seen from one aspect, there is provided a device for engaging a pipe, cable or other elongate article to displace that article longitudinally, the device comprising a tubular body formed of a plurality of longitudinal parts arranged to be opened apart and then closed together around the elongate article to be displaced, and at least one collar positioned within the tubular body and formed of a plurality of parts carried by respective parts of the tubular body, the collar having a radially inner surface arranged to form an interference engagement with the outer surface of the article to be displaced, and a radially outer surface arranged to engage the inner surface of the tubular body, at least the outer surface of the collar or the inner surface of the tubular body being tapered towards a trailing end of the device.

In use, the longitudinal parts of the tubular body are opened and then engaged around the elongate article to be displaced, such that the inner surface of the collar forms an interference engagement with the surface of that article. The tubular body is then moved longitudinally in a forward direction. This causes the collar to slide towards the trailing end of the tubular body, because of the interference engagement between the collar and the surface of the elongate article around which the device is engaged: this has the effect of wedging the collar firmly against the surface of the pipe. Continued movement of the device therefore displaces the elongate article in the same direction. At the end of a forward stroke of the device, the device may be slid freely back along the article, then another forward stroke executed, and so on until the article has been displaced the required distance: finally, the parts of the tubular body are opened apart to remove the tubular body from the article.

The tubular body may be arranged to receive a single gripping collar. Instead it may be arranged to receive a number of gripping collars, spaced apart along its length: in this case the number of gripping collars which are used, and the positions in which they are placed, may be selected to suit the application. Where the tubular body receives a number of collars, spaced apart along its length, then, in each part of the body, the respective parts of the collars may be joined by a longitudinal spine. The collar parts of each part of the body thus form a unit so that those parts slide as a unit and can be removed and replaced as a unit.

Preferably the or each collar has a radially outer surface which is tapered to match a tapering section of the inner surface of the tubular body in which it is inserted.

Preferably the radially inner surface of the or each collar is formed with a series of annular teeth, preferably directed towards the forward end of the device.

Preferably each part of the collar is formed to a reduced thickness (e.g. by one or more grooves in its inner surface) at a discrete location or at intervals around its circumference, to impart flexibility to it and enable it to adopt a reduced diameter as it is slid, in use, towards the trailing end of the device.

Preferably each of the longitudinal parts of the tubular body is provided with a retaining formation for the respective part of the or each collar. Preferably the collars can be removed and replaced by collars selected to match the diameter of the pipe or other article on which the device is to be used.

Also in accordance with the present invention, as seen from a second aspect, there is provided a device for engaging a pipe, cable or other elongate article to displace that article longitudinally, the device comprising a tubular body formed of a plurality of longitudinal parts arranged to be opened apart then closed together around the elongate article to be displaced, the inner surface of the elongate body being arranged to form an engagement with the outer surface of the article to be displaced.

In use of this device, the longitudinal parts of the tubular body are opened and then closed around the elongate article to be displaced, such that the inner surface of the tubular body engages the outer surface of the elongate article. The longitudinal parts of the tubular body are then held firmly together and the device is moved longitudinally in a forward direction, to displace the elongate article. At the end of a forward stroke of the device, the forces holding the parts of the tubular body together are relaxed, so that the device may be slid back along the article, for another forward stroke to be executed. Preferably the inner surface of the tubular body is formed with a number of annular teeth, preferably directed towards the forward end of the device.

Conveniently, in either of the above-defined devices, the tubular body may comprise two longitudinal parts, although it may instead comprise three or even more longitudinal parts. Preferably the adjacent parts are coupled together so that they can be flexed relative to each other, for opening and closing the tubular body. The longitudinal parts may be formed as one-piece with an integral hinge coupling them together. Preferably the tubular body is made of plastics material by injection moulding.

Either of the above-defined devices may be a hand-held device for manual use. For this purpose, preferably the tubular body has an outer surface for gripping by hand. Preferably a radially-outwardly projecting flange is provided at least at the forward end (and preferably at both ends) of the tubular body, to act as a safety-guard. The tubular body may be relatively short, such that it is gripped by one hand only: alternatively, it may be sufficiently long that it may be gripped by two hands, one behind the other. The parts of the tubular body may be arranged to clip together: a hook may be coupled to one end of the tubular body, to enable it to be towed; in this case, the device may be used for pulling live electric cables, particularly cables up to perhaps 1000 volts rating.

Instead however, either of the above-defined devices may be incorporated in a powered apparatus for the longitudinal displacement of a pipe, cable or other elongate article.

Preferably the trailing end of either of the above-defined devices is formed with an inwardly-directed annular edge for engaging the surface of the article to be displaced. This edge then acts to scrape dirt etc. from the surface of the article as the device is slid in the retracting direction, prior to a forward stroke to displace the article. Instead, this trailing end of the tubular body may be arranged to receive an annular insert (formed in a number of parts which are retained by the respective longitudinal parts of the tubular body), the inner edge of this insert forming a scraping edge. The insert can then be selected of appropriate diameter for the article on which the device is to be used.

BRIEF DESCRIPTION OF THE DRAWINGS

Embodiments of the present invention will now be described by way of examples only and with reference to the accompanying drawings, in which.

DETAILED DESCRIPTION OF THE DRAWINGS

Figure 1:
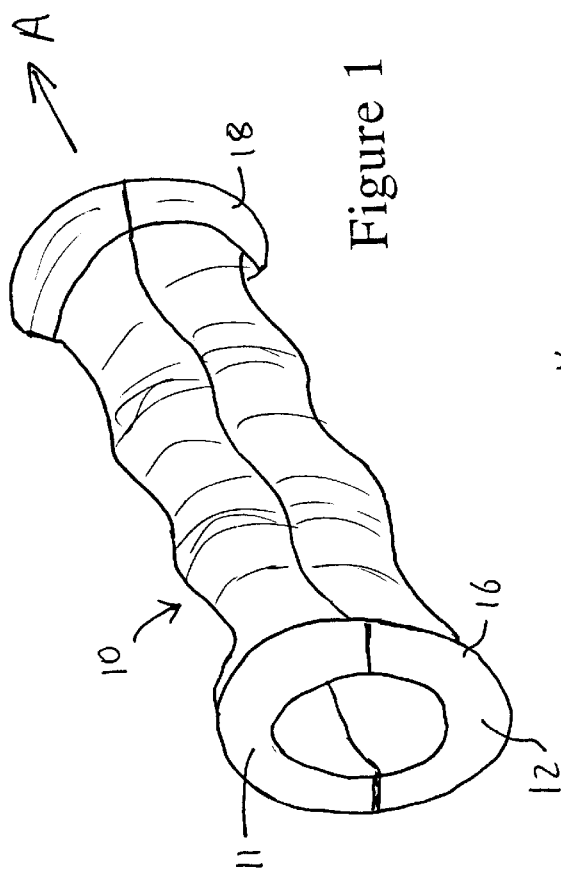
FIG. 1 is an isometric view of a first embodiment of device in accordance with the present invention, for engaging a pipe, cable or other elongate article to facilitate the longitudinal displacement of that article.
Figure 2:
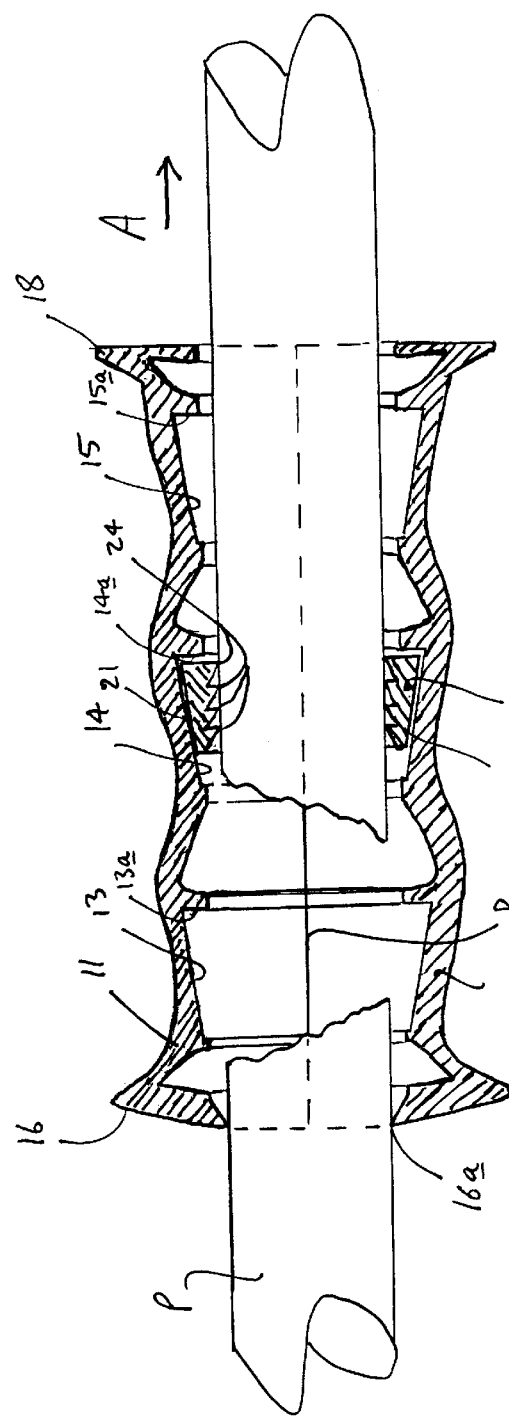
FIG. 2 is a longitudinal section through the device of FIG. 1, when engaged around a pipe.

Referring to FIGS. 1 and 2 of the drawings, there is shown a device for engagement around a pipe P and arranged to facilitate longitudinal displacement of the pipe P in the direction indicated by the arrow A. The device comprises a rigid tubular body 10 which is split longitudinally (along a plane indicated at B which is perpendicular to the plane of the pipes) into two identical parts 11, 12: the two parts 11, 12 are coupled together along one side, for example by means of an integral hinge (not shown), to enable the two parts of the tubular body 10 to be opened apart then closed together around the pipe P, or around a cable or other elongate article which is to be longitudinally displaced.

Internally, the tubular body 10 is formed with three frusto-conical sections 13, 14, 15 spaced apart along its length and all tapering in the same direction (which is opposite to the direction A in which the device is arranged to displace the pipe, cable or other article). An annular shoulder 13a,14a,15a is formed at the larger-diameter end of each of the frusto-conical sections 13,14,15.

An annular, radially-outwardly projecting flange 16,18 is formed at each end of the tubular body 10. The outer surface of the tubular body varies in diameter in undulating manner between the two flanges 16,18 to provide a succession of annular ridges and grooves and such that the wall thickness of the tubular body is generally uniform throughout its length, to facilitate manufacture of the tubular body by injection moulding: the profile of the outer surface of the tubular body also improves its ability to be gripped by hand. The flanges 16,18 at the opposite ends of the tubular body serve to prevent the user's hand or hands slipping off the device when in use and also guard the hands against being injured by striking adjacent structures in use of the device. The flange 16, at the trailing end of the device, is formed with a radially-inwardly-directed annular edge 16a for a purpose which will be described below.

Figure 3:
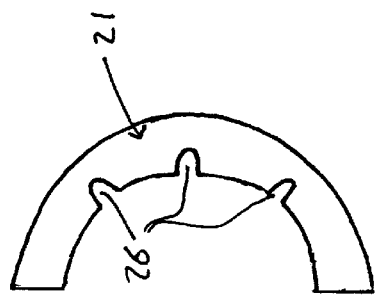
FIG. 3 is a plan view of a gripping insert of the device of FIGS. 1 and 2.
Figure 4:
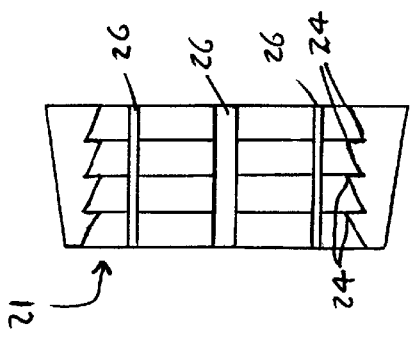
FIG. 4 is an end view of the gripping insert of FIG. 3.

The device further includes at least one rigid gripping collar 20, which is divided into two semi-circular parts or inserts 21,22, one of which is shown in FIGS. 3 and 4. The collar 20 has a frusto-conical outer surface matched to the tapering sections 13,14,15 of the tubular body 10. The inner surface of the collar is formed with a series of annular teeth 24 of equal diameter, directed towards the larger-diameter end of the collar (i.e. the direction A in which the pipe P is to be displaced). The inner surface of the collar is moreover formed with a series of grooves 26, spaced apart around its circumference, and effectively dividing the series of annular teeth 24 at intervals into successive sections: the grooves 26 provide a degree of flexibility between the adjacent toothed sections of the collar; instead of a series of grooves, each part of the collar may be formed with a single groove only.

The collar 20 is positioned in one of the tapering sections of the tubular body 10, with one part 21 of the collar in the body part 11 and the other part 22 of the collar in the body part 12. Each part of the tubular body is formed with projections (not shown) at both circumferential ends of each tapering section, the opposite circumferential ends of the collar part 21 or 22 engaging behind these projections to retain that collar part within the tapering section of the body part.

FIG. 2 shows the device with a single gripping collar, which is engaged in the centre tapering section 14 of the tubular body. Instead, two such gripping collars may be provided, for example engaged in the end tapering sections 13,15: alternatively, three gripping collars may be provided, engaged in all three tapering sections 13,14,15. The two parts of the or each collar may be removed (after flexing it to disengage it from the retaining projections of the respective body part) and replaced: collars of different internal diameters may be used for pipes or cables etc. of different outer diameters.

In use, the two parts 11,12 of the tubular body are hinged open then closed together around the pipe P or other article to be displaced. The tubular body 10 is gripped by hand, the user's hand being applied around the outer surface of the body: however, only sufficient pressure is needed simply to hold the two parts of the body closed around the pipe P. The teeth 24 of the collar or collars 20 of the device only form an interference engagement with the surface of the pipe P and do not bite into this surface. Then the user pushes or pulls the device in the direction A: initially, the or each collar 20 is caused to slide towards the smaller-diameter end of its tapering section of the tubular body, because of the interference engagement between the collar and the surface of the pipe P; this has the effect of forcing the collar radially inwardly and so enhancing its grip on the pipe P. It will be noted that the collar is able to deform to the required smaller diameter because of the flexibility imparted by its series of grooves 26.

The user is accordingly able to displace the pipe P whilst maintaining only a relatively light grip around the device: the harder the user pushes or pulls the device, the more firmly the collar or collars 20 embrace the pipe P.

Having advanced the pipe P through a convenient distance, the user can then freely slide the device back along the pipe, then push or pull the device again in the direction A in order to displace the pipe further in that direction. As the user slides the device in the retraction direction, the annular edge 16a scrapes lightly along the surface of the pipe to remove any dirt or grease which may be present on that surface.

Instead of the annular edge 16a, this end of the tubular body may be formed with an internal groove to accept an annular insert (formed in two parts, one for each part of the tubular body) which is formed with a scraping edge: this insert can then be selected of a diameter which matches the pipe etc. on which the device is to be used.

Figure 5:
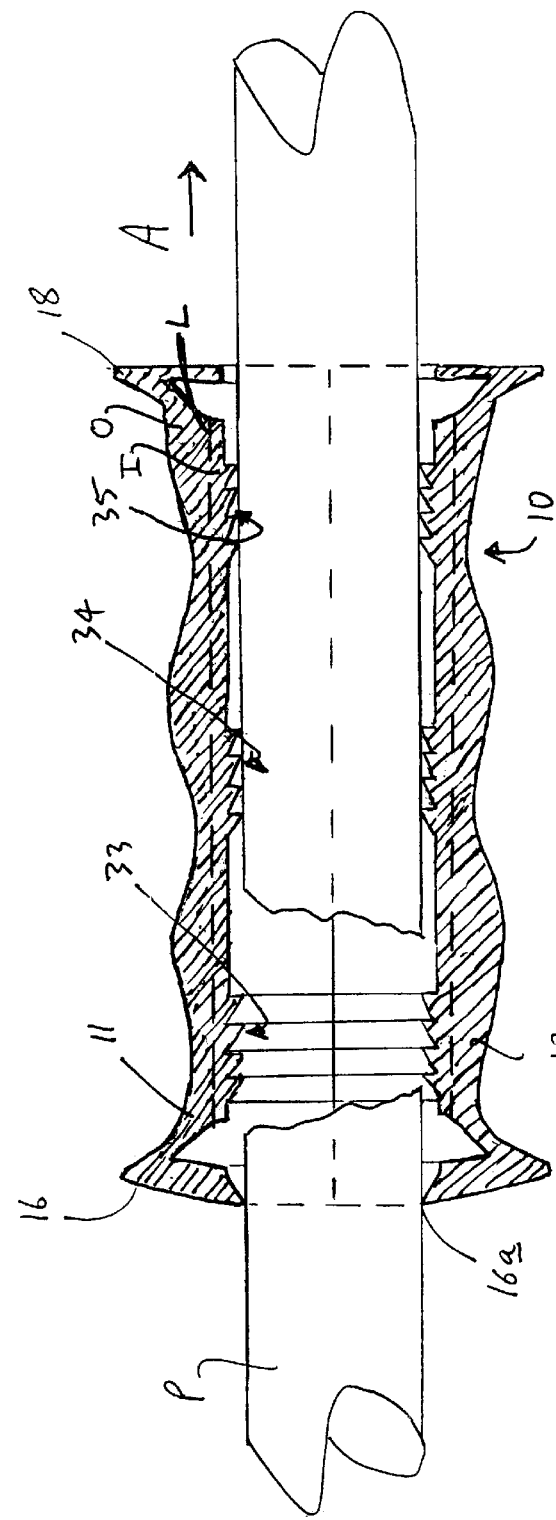
FIG. 5 is a section, similar to FIG. 2, through a second embodiment of device in accordance with the present invention.

FIG. 5 shows a modified embodiment of the invention, in which the rigid tubular body 10 of the device is again split into two longitudinal parts 11,12: however, the collar 20 of the above-described device is omitted and instead the inner surface of the tubular body is provided with three series 33,34,35 of annular teeth, directed towards the forward end of the device. In use, the two parts 11,12 (which again are preferably coupled together e.g. by an integral hinge) are opened apart then closed around the pipe P or other article to be displaced: the device is gripped firmly by hand so that teeth 33,34,35 embrace the surface of the pipe P; then the device is moved in the forward direction A to displace the pipe P. The user then relaxes his grip around the device, so that it can be slid freely back in the retracting direction, before the grip is tightened again and another forward stroke executed, and so on.

It will be appreciated that the device of FIG. 5 is suited to a single diameter of pipe etc., but is less expensive to manufacture than the device of FIGS. 1 to 4. In a modification, and as indicated by the dotted line L, the tubular body 10 may comprise an outer sleeve O and an inner sleeve I, the outer sleeve, formed with the teeth 34, being of slightly elastomeric material.

What is claimed is:

1. A device for engaging a pipe, cable or other elongate article to displace said article longitudinally, the device comprising a tubular body having a straight passage therethrough from end-to-end, the tubular body being formed of a plurality of longitudinal parts extending from end-to-end thereof and arranged to be opened apart and then closed together around the elongate article to be displaced, and at least one gripping collar positioned within the tubular body and formed of a plurality of parts carried by respective parts of the tubular body, the gripping collar having a radially inner surface arranged to form an interference engagement with the outer surface of the article to be displaced, and a radially outer surface arranged to engage the inner surface of the tubular body, at least the outer surface of the gripping collar or the inner surface of the tubular body being tapered towards a trailing end of the device.

2. A device as claimed in claim 1, in which said tubular body is arranged to receive a single said gripping collar.

3. A device as claimed in claim 1, in which said tubular body is arranged to receive a plurality of said gripping collars, spaced apart along its length.

4. A device as claimed in claim 3, in which, in each longitudinal part of said tubular body, the respective parts of the gripping collars are joined by a longitudinal spine.

5. A device as claimed in claim 1, in which the at least one gripping collar has a radially outer surface which is tapered to match a tapering section of the inner surface of said tubular body.

6. A device as claimed in claim 1, in which the radially inner surface of the at least one gripping collar is formed with a series of annular teeth.

7. A device as claimed in claim 6, in which said annular teeth are directed towards a forward end of the device.

8. A device as claimed in claim 1, in which each part of the at least one gripping collar is formed to a reduced thickness at one or more locations around its circumference.

9. A device as claimed in claim 1, in which each longitudinal part of the tubular body is provided with a retaining formation for the respective part of the at least one collar.

10. A device as claimed in claim 1, in which said tubular body comprises two said longitudinal parts.

11. A device as claimed in claim 1, in which said longitudinal parts of said tubular body are coupled together for flexing relative to each other, for opening and closing the tubular body.

12. A device as claimed in claim 1, in the form of a hand-held device for manual use.

13. A device as claimed in claim 1, incorporated in a powered apparatus.

14. A device as claimed in claim 1, provided at a trailing end thereof with an inwardly-directed annular scraping edge for engaging the surface of the article to be displaced.

15. A device as claimed in claim 14, comprising an annular insert the inner edge of which forms said scraping edge.

16. A device as claimed in claim 1, in which means are provided for holding said parts of the tubular body together when closed around said elongate article.

17. A device as claimed in claim 16, in which said means for holding said body parts together comprise inter-engaging clips or other formations provided on the respective body parts.

18. A device as claimed in claim 1, in which said tubular body is provided with means enabling the device to be towed.

* * * * *